United States Patent [19]
Gobart et al.

[11] Patent Number: 5,992,918
[45] Date of Patent: Nov. 30, 1999

[54] BI-FOLD GULL WING VEHICLE DOOR

[75] Inventors: James George Gobart, Rochester; William L. Gobart, Lenox; Edward Aloysius Jedrzejczak, Brown City, all of Mich.

[73] Assignee: General Motors Corporation, Detroit, Mich.

[21] Appl. No.: 09/073,866

[22] Filed: May 7, 1998

[51] Int. Cl.[6] ........................................................ B60J 5/06
[52] U.S. Cl. ................................. 296/147.13; 296/147.1; 296/155
[58] Field of Search ........................... 296/146.1, 146.13, 296/155

[56] References Cited

U.S. PATENT DOCUMENTS

| D. 150,161 | 7/1948 | Sanmori . | |
|---|---|---|---|
| 2,815,243 | 12/1957 | Campbell | 296/28 |
| 2,903,296 | 9/1959 | Barenyi | 296/44 |
| 3,511,530 | 5/1970 | Barenyi | 296/146 |
| 4,184,709 | 1/1980 | Kim . | |
| 5,035,463 | 7/1991 | Kato et al. | 296/223 |
| 5,573,053 | 11/1996 | Hanemaayer | 160/206 |

FOREIGN PATENT DOCUMENTS

| 1 270 666 | 7/1961 | France . | |
|---|---|---|---|
| 1480429 | 6/1969 | Germany | 296/146.13 |
| 33 04 660 A1 | 8/1984 | Germany . | |
| 42 27 411 A1 | 2/1994 | Germany . | |
| 2-171319 | 12/1988 | Japan . | |

Primary Examiner—Joseph D. Pape
Attorney, Agent, or Firm—Charles E. Leahy

[57] ABSTRACT

A vehicle body has front and rear door openings defined by front, middle and rear pillars and by the vehicle roof. A bi-fold door includes upper and lower door portions, each of which extends full length from the front pillar to the rear pillar. An upper hinge acts between the roof and the upper edge of the upper door portion. A door panel hinge acts between the adjacent edges of the upper and lower door portions. A track extends vertically along the middle pillar and a track follower is carried by the lower door portion at the lower edge adjacent the bottom thereof and is engaged in the track. A door beam is mounted within the lower door portion and extends the full length of the door from the front to the rear pillar. A first door latch is mounted on the front pillar and a second door latch is mounted on the rear pillar. Latch strikers are mounted respectively on the front and rear ends of the lower door portion to engage with the first and second door latches. A telescopic spring strut acts between at least one of the pillars and the upper door portion to assist in lifting the upper door portion about the upper hinge. As the upper panel pivots upwardly about the roof hinge, the upper and lower panels hinge relative one another at the door panel hinge and the bottom edge of the lower panel follows the track in the middle pillar so that the door assumes a folded-in-half position stored above the vehicle roof.

6 Claims, 3 Drawing Sheets

BI-FOLD GULL WING VEHICLE DOOR

The invention relates to a bi-fold gull wing door which closes both front and rear door openings in a vehicle body and folds in half as it rises to an open position stored above the vehicle roof.

BACKGROUND OF THE INVENTION

It is well known in motor vehicles to have a front door opening and a rear door opening which are respectively closed by separate front and rear doors.

It is also known to provide a "gull wing" door in which a single door closes both the front and rear door openings, with that single door hinged to the roof so that the door pivots upwardly about its top edge to simultaneously open the front and rear door openings. In its open position, the gull wing door projects substantially above the vehicle roof.

The present invention provides a new and improved bi-fold gull wing door which stores in a compact folded position above the vehicle body.

SUMMARY OF THE INVENTION

According to the invention, a vehicle body has front and rear door openings defined by front, middle and rear pillars and by the vehicle roof. A bi-fold door includes upper and lower door portions, each of which extends full length from the front pillar to the rear pillar. An upper hinge acts between the roof and the upper edge of the upper door portion. A door panel hinge acts between the adjacent edges of the upper and lower door portions. A track extends vertically along the middle pillar. A track follower is carried by the lower door portion at the lower edge thereof and is engaged in the track. A door beam is mounted within the lower door portion and extends the full length of the door from the front to the rear pillar. A first door latch is mounted on the front pillar and a second door latch is mounted on the rear pillar. Latch strikers are mounted respectively on the front and rear ends of the lower door portion to engage with the first and second door latches. A telescopic spring strut acts between at least one of the pillars and the upper door portion to assist in lifting the upper door portion about the upper hinge. As the upper panel pivots upwardly about the roof hinge, the upper and lower panels hinge relative one another at the door panel hinge and the bottom edge of the lower panel follows the track in the middle pillar. Thus, the door folds in half as it rises to the open position stored above the vehicle body.

BRIEF DESCRIPTION OF THE DRAWINGS

These and other features, objects and advantages of the invention will become apparent upon consideration of the Description of the Preferred Embodiment and the appended drawings in which.

DESCRIPTION OF THE PREFERRED EMBODIMENT

Figure 1:
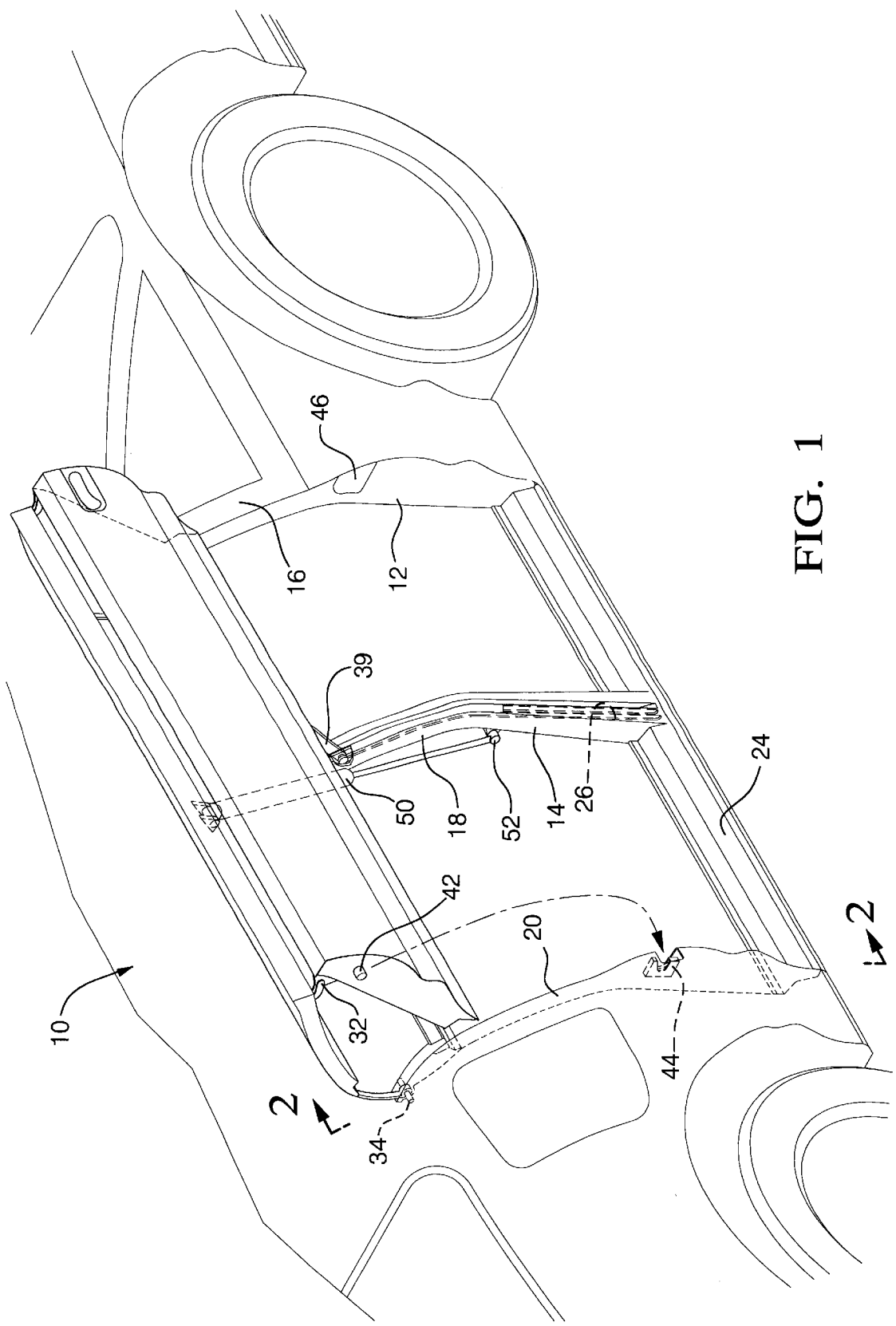
FIG. 1 is a perspective view of a vehicle body having the bi-fold gull wing door of the present invention.

Referring to the drawings, it is seen that a vehicle body includes a front door opening 12 and a rear door opening 14. The front door opening 12 is defined by a front pillar 16 and a middle pillar 18. The rear door opening 14 is defined by the middle pillar 18 and a rear pillar 20. The upper edge of the door openings 14 and 16 is defined by vehicle roof rail panel 22 and the bottom edge is defined by rocker panel 24.

A bi-fold door for closing the door openings 14 and 12 includes an upper door panel portion 28 and a lower door panel portion 30 which are hinged together at a door panel hinge 32. The upper panel 28 is hinged to the vehicle roof header 22 at hinge 34. It will be understood that these hinges may be a piano-style hinge which extends the full length of the door panels or alternatively the hinges may be discrete first and second hinges provided at the front and rear corners of the panel. The upper panel 28 preferably includes a transparent panel to provide a window.

As best seen in FIG. 1, a track 36 is provided in the middle pillar 18 and is engaged by a track follower 37 carried by an arm 39 of the lower door panel portion 30 at the lower edge thereof. A side intrusion door beam 38 is provided within the lower door panel portion 30 and extends the full length of the door between the front pillar 16 and the rear pillar 20. A rear striker 42 is mounted on the lower door portion 30 at the rear end thereof and preferably connects with the rear end of the door beam 38. A similar striker, not shown, is provided at the front end of the lower door portion 30. A rear door latch 44 is mounted on the rear pillar 20 and receives the rear striker 42 when the door is in the closed position to latch the door in the closed position. A similar latch 46 is provided at the front pillar 16.

Figure 3:
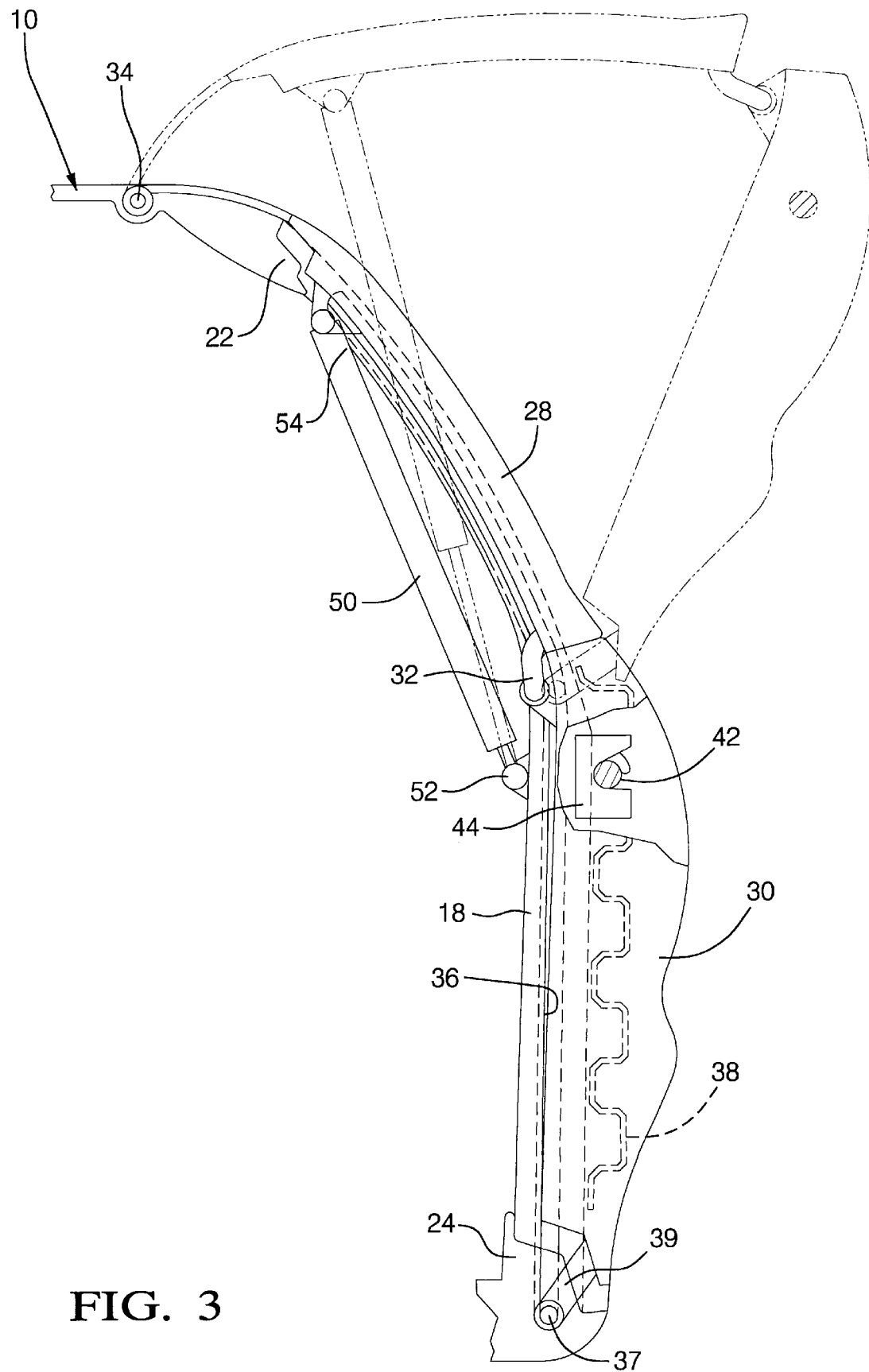
FIG. 3 is a section view similar to FIG. 2 but showing the door in the closed position.

FIG. 3 shows the closed position of the door in which the strikers are captured within the door latches to maintain the door in the closed position. It will be appreciated that the door beam 38 extends the full distance from the front pillar across the middle pillar to the rear pillar to thereby overlap the pillars and provide substantial resistance to intrusion. Furthermore, it will be appreciated that a suitable connection between the striker pins and the door beam 38 will be effective to transfer loads into the door latches and the pillars.

Figure 2:
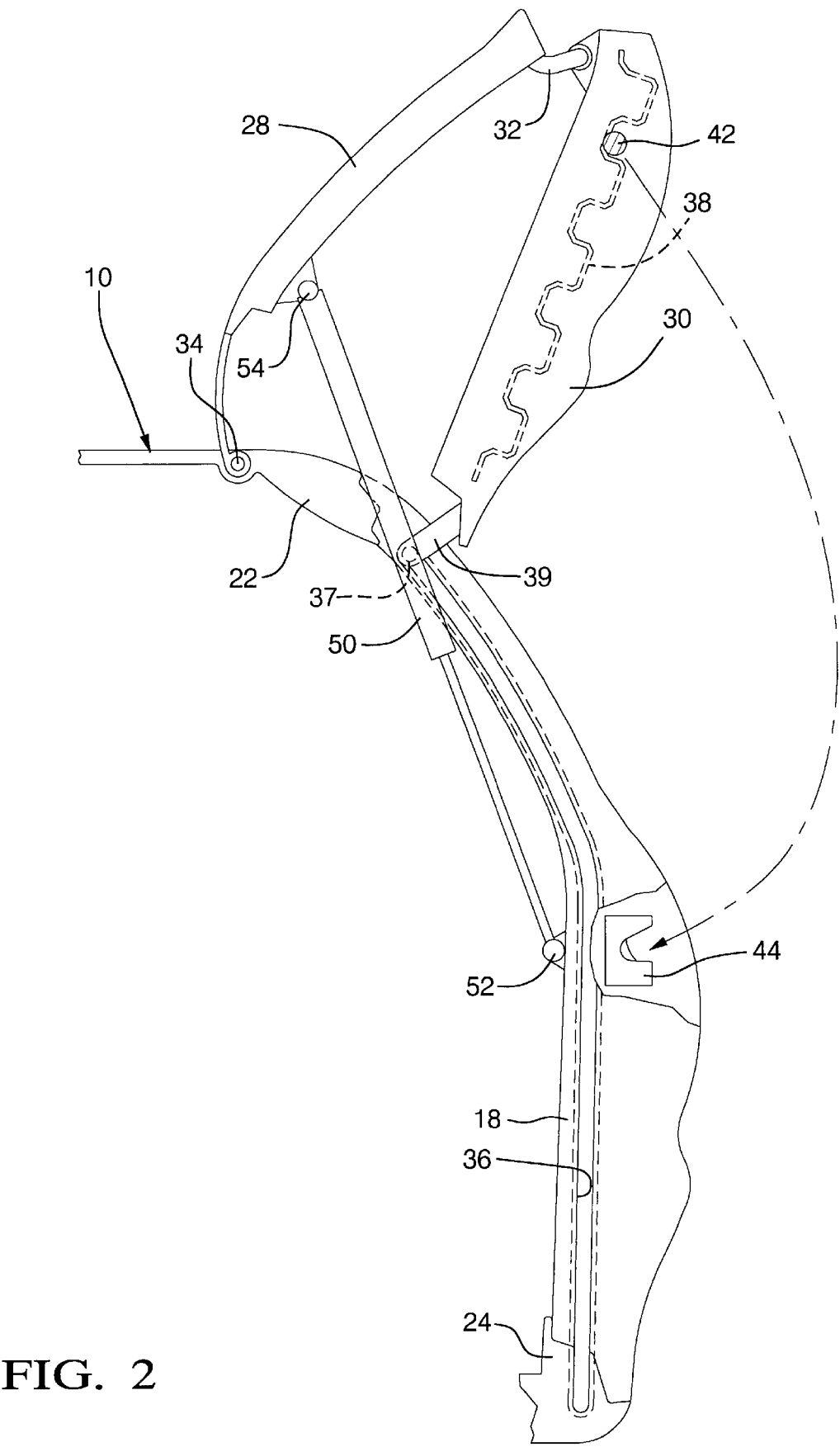
FIG. 2 is a section view of the bi-fold gull-wing door taken in the direction of arrows 2—2 of FIG. 1.

The door is moved from the closed position to the open position by actuating the latches to release the strikers. The lower door panel portion 30 is pushed outwardly via a handle not shown. The opening movement is assisted by a telescoping spring strut 50 which is attached to the middle pillar 18 by a pivot 52 and attached to the door upper panel portion 28 by a pivot 54. During opening movement, the track follower 37 remains captured within the track 36 on the middle pillar 18 so that the lowermost edge of the lower door panel 30 tracks closely along the outside of the vehicle body along the path defined by the track 36. The door continues to swing upwardly and fold in half until it reaches the full open position of FIG. 2, in which the upper door portion 28 and lower door portion 30 are extending generally vertically upright in a stored position above the vehicle body to provide full and unobstructed ingress and egress for passengers through the door openings 14 and 12.

Thus, it is seen that the invention provides a gull wing-type door which folds in half to minimize the distance by which the door extends above the vehicle body and thereby limit interference with a garage ceiling or other potential obstruction, as well as facilitate access for storage of a wheelchair or cargo.

We claim:

1. In a vehicle body having front and rear door openings defined by front, middle and rear pillars and a roof, the improvement comprising;

a bi-fold door for simultaneously closing the front and rear door opening and having upper and lower door portions each extending from the front pillar to the rear pillar, a door hinge acting between the roof and the upper door portion, a door panel hinge acting between the upper and lower door portions;

a track extending vertically along the middle pillar;

a track follower carried by the lower door portion adjacent the bottom thereof and engaged in the track.

2. The improvement of claim 1 comprising:

a front door latch on the front pillar and a second door latch mounted on the rear pillar, and front and rear latch strikers mounted respectively on the front and rear end of the lower door portion to engage with the door latches.

3. The improvement of claim 1 further comprising a telescopic support strut acting between one of the pillars and the upper door portion to assist in lifting the upper door portion about the roof hinge.

4. In a vehicle body having front and rear door openings defined by front, middle and rear pillars and a roof, the improvement comprising;

a bi-fold door for simultaneously closing the front and rear door opening and having upper and lower door portions each extending from the front pillar to the rear pillar, a roof hinge acting between the roof and the upper door portion, a door panel hinge acting between the upper and lower door portions;

a track extending vertically along the middle pillar;

a track follower carried by the lower door portion adjacent the bottom thereof and engaged in the track;

and a door beam mounted within the lower door portion and extending from the front pillar to the rear pillar.

5. The improvement of claim 4 further comprising:

a front door latch on the front pillar and a second door latch mounted on the rear pillar, and front and rear latch strikers connected on the front and rear end of the door beam to engage with the door latches.

6. The improvement of claim 5 further comprising:

a telescopic support strut acting between the center pillar and the upper door portion to assist in lifting the upper door beam portion above the upper hinge.

* * * * *